Dec. 11, 1951  F. HRIBAR  2,577,851

PRESSURE RELIEF VALVE

Filed Aug. 9, 1946

INVENTOR.
FRANK HRIBAR
BY Richey & Watts
ATTORNEYS

Patented Dec. 11, 1951

2,577,851

UNITED STATES PATENT OFFICE 2,577,851

PRESSURE RELIEF VALVE

Frank Hribar, Cleveland, Ohio, assignor to The Weatherhead Company, Cleveland, Ohio, a corporation of Ohio Application August 9, 1946, Serial No. 689,442

2 Claims. (Cl. 137—53)

This invention relates to a relief valve. Those skilled in the valve art will appreciate that basically the amount of gaseous fluid which can be exhausted through a relief valve during a given time has in the past been substantially proportional to the size of the valve and inversely proportional to the pressure itself. However, increasing the size of the valve to accommodate an increased flow generally results in an additional cost of manufacture and in some cases there may be space limitations which offer serious problems. I have found, however, that by designing my relief valve so that the parts over which the fluid flows are streamlined that I can produce a higher velocity flow for a given size valve than otherwise possible.

Another difficulty encountered with relief valves or check valves is that of chatter or flutter of the valve when it is opened. It is another object of my invention to eliminate such chatter and, by taking advantage of this streamlined flow, to prevent build up of pressure on the atmospheric side of the moving valve member. These and other objects will be apparent as the following detailed description of my invention proceeds.

Figure 1:
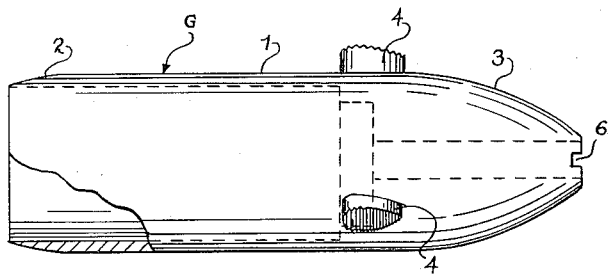
Fig. 1 is an external view of the streamlined poppet valve member.
Figure 2:
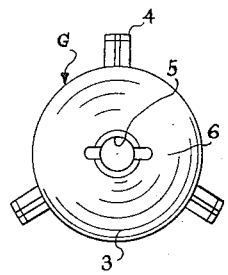
Fig. 2 is an end view of the nose of the member.
Figure 4:
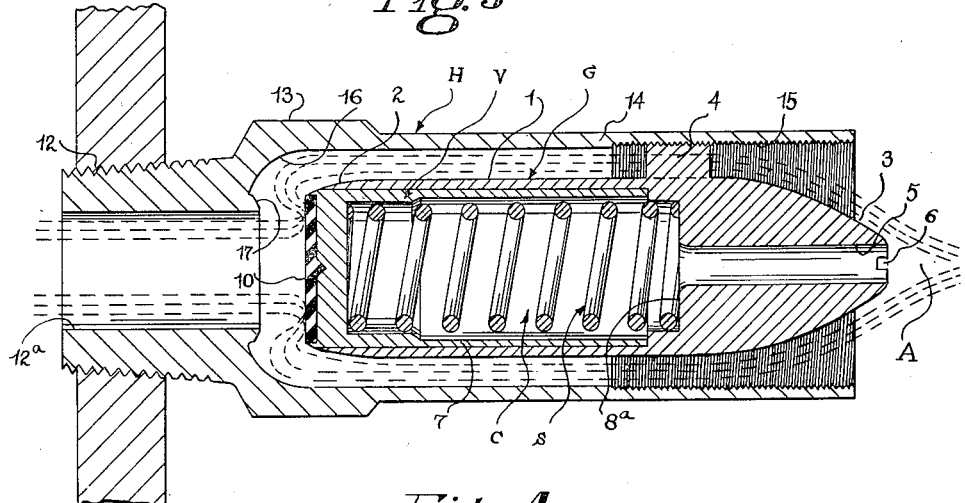
Fig. 4 is a cross sectional view of the entire valve assembly showing the valve in its open or pressure relieving position.

As seen in Figs. 1 and 2, the poppet guide member G has a body portion 1 in the form of a sleeve and is shaped generally like a projectile with a curved or boat-tailed portion 2 and a streamlined nose 3. Circumferentially spaced blocks 4 are provided for threading the guide into the valve body. As seen in Fig. 4, the outer surface of these blocks forms an interrupted thread and they present a streamlined surface to the fluid stream passing over the guide member. A slot 6 is provided to receive a screw driver during adjustment of the valve.

Figure 3:
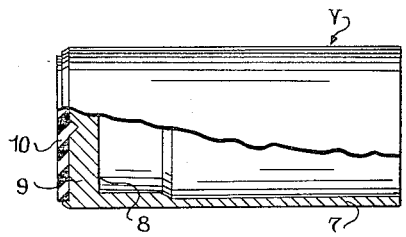
Fig. 3 is a partially sectioned view of the poppet valve.

In Fig. 3 the poppet valve itself is shown. It has a sleeve portion 7, a spring seat portion 8 and a cupped portion 9 which receives a resilient closure washer 10.

In Fig. 4 can be seen the valve housing H which may be threaded or otherwise fastened as at 12 to the container or tank which holds the fluid under pressure. A wrench-receiving part 13 may be provided and the balance of the housing comprises a sleeve portion 14 threaded internally as at 15 to receive the threaded blocks 4 of the guide member. Adjacent the inner end of the housing a curved wall 16 is provided having a smooth contour which wall merges with the valve seat 17. When the valve is closed seat 17 is engaged by the sealing washer 10. The spring S rests in the spring pocket 8 of the valve member V and its other end rests in a pocket 8a formed in the guide member G. The spring normally forces member V against the valve seat 17. Valve member V and guide member G cooperate to form a chamber C which is at atmospheric pressure because of the bore 5 in the guide member.

In operation, the valve is screwed in place in the tank and the valve guide member is adjusted in or out of the housing H until the valve opens at the desired predetermined pressure. When the valve opens, the fluid flows through the inlet port 12a and out between the portion 1 of the valve guide and the sleeve 14 of the valve housing. As can be seen by the stream lines indicating fluid flow, the air which rushes through the inlet port 12a impinges on the flat washer 10 so that in addition to the force due to static pressure, kinetic pressure tends to hold the valve open without chatter. It can also be seen how the shape of the curved portion 16 of the valve housing prevents turbulence in this area. Since the parts are streamlined, a laminar or streamlined flow will result with a minimum turbulence. This laminar flow permits more fluid to pass through the valve for a given size valve seat.

Due to the shape of the nose portion 3, as the fluid passes thereover and leaves the vicinity of the valve, a low pressure area A is formed in accordance with the laws of physics. Because of this low pressure area, fluid is exhausted from the chamber C behind the valve poppet and out through the bore 5 in the valve guide. This aids in keeping the valve open and furthermore it aids in prevention of chatter. In the conventional type of valves there is a tendency for turbulence to cause fluid pressure to build up adjacent the exhaust portion of the valve and to load up the chamber behind the movable valve member which is one of the causes of objectionable chatter. With my construction the combination of the effect of the air impinging upon the valve seat at the inlet port and the exhausting of air from behind the valve is very effective in preventing chatter. Furthermore, the streamline design increases the flow for a given size unit.

I contemplate that various modifications may be made without departing from the essence of the invention. The method whereby the spring is supported may be varied in accordance with conventional practice. The exterior shape of the valve housing H is unimportant. The exact dimensions and proportions of the parts shown may be varied in accordance with the pressure and volume of fluid to be handled so long as the actions herein described are obtained. Generally, however, the valve guide should have a streamlined shape in the general nature of that shown in the drawings. The number and disposition of the interrupted thread members 4 may be varied and I contemplate that fins may be substituted for the air foil section thread members if so desired.

I also contemplate that the relation of poppet valve and guide member may be reversed and the guide member may telescope in the poppet valve.

These and other modifications may be made without departing from the spirit of the invention as defined in the appended claims.

Having thus described the present invention so that others skilled in the art may be able to understand and practice the same. I state that what I desire to secure by Letters Patent is defined in what is claimed.

What I claim is:

1. In a check valve, an elongated valve body having an inlet port, a valve seat surrounding said port and a through bore leading from said seat, a tubular valve guide supported in said bore by means which permit fluid to pass between said guide and body, a valve member movably telescoped with and closely fitting said guide for engaging said seat, said valve member having a substantially flat seating face, said valve member and guide cooperating to form a spring chamber, a spring in said chamber to seat the valve member, the spacing of said valve and the rearward portion of the guide from the body being such that with the valve open a fluid passageway is formed around the parts that is substantially no smaller in area than that of the port whereby substantially no fluid velocity increase occurs as fluid flows around the valve and rearward guide portion, the axially outer end of said guide being formed with a streamlined nose whereby fluid velocity increases as it flows past the end of said nose and a low pressure area is formed by the streamline flow of fluid past the nose when the valve member is unseated, and a port in said nose leading from the portion thereof at said low pressure area into said chamber whereby fluid pressure in said chamber is less than that where the fluid flows between said valve and body, said pressure differential and impact of fluid on said flat valve face tending to hold said valve open.

2. In a check valve, an elongated valve body having an inlet port, a valve seat surrounding said port and a through bore leading from said seat, a tubular valve guide supported in said bore by means which permit fluid to pass between said guide and body, a valve member movably telescoped with and closely fitting said guide for engaging said seat, said valve member and guide cooperating to form a spring chamber, a spring in said chamber to seat the valve member, the spacing of said valve and the rearward portion of the guide from the body being such that with the valve open a fluid passageway is formed around the parts that is substantially no smaller in area than that of the port whereby substantially no fluid velocity increase occurs as fluid flows around the valve and rearward guide portion, the axially outer end of said guide being formed with a streamlined nose whereby fluid velocity increases as it flows past the end of said nose and a low-pressure area is formed by the streamline flow of fluid past the nose when the valve member is unseated, and a port in said nose leading from the portion thereof at said low-pressure area into said chamber whereby fluid pressure in said chamber is less than that where the fluid flows between said valve and body, said pressure differential tending to hold said valve open, the portion of said valve facing said port being flattened to receive the impact of fluid flow through the valve.

FRANK HRIBAR.

REFERENCES CITED

The following references are of record in the file of this patent:

UNITED STATES PATENTS

| Number | Name | Date |
| --- | --- | --- |
| 1,679,774 | Larner | Aug. 7, 1928 |
| 1,802,720 | Junkers | Apr. 28, 1931 |
| 1,987,974 | Richardson | Jan. 15, 1935 |
| 2,075,167 | Broecker | Mar. 30, 1937 |
| 2,170,478 | Long et al. | Aug. 22, 1939 |

FOREIGN PATENTS

| Number | Country | Date |
| --- | --- | --- |
| 373,760 | Germany | Apr. 16, 1923 |